US011040717B2

(12) United States Patent
Cherniakov et al.

(10) Patent No.: US 11,040,717 B2
(45) Date of Patent: *Jun. 22, 2021

(54) SYSTEM FOR USE IN A VEHICLE

(71) Applicant: JAGUAR LAND ROVER LIMITED, Coventry (GB)

(72) Inventors: Mikhail Cherniakov, Warwickshire (GB); Alex Bystrov, Warwickshire (GB); Edward Hoare, Warwickshire (GB); Marina Gashinov, Warwickshire (GB); Thuy-Yung Tran, Warwickshire (GB); Nigel Clarke, Warwickshire (GB)

(73) Assignee: Jaguar Land Rover Limited, Coventry (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/316,295

(22) PCT Filed: Jun. 28, 2017

(86) PCT No.: PCT/EP2017/066038
§ 371 (c)(1),
(2) Date: Jan. 8, 2019

(87) PCT Pub. No.: WO2018/007228
PCT Pub. Date: Jan. 11, 2018

(65) Prior Publication Data
US 2019/0193735 A1   Jun. 27, 2019

(30) Foreign Application Priority Data

Jul. 8, 2016   (GB) ..................... 1611912

(51) Int. Cl.
*B60W 30/18*   (2012.01)
*B60W 40/068*   (2012.01)
*B60W 40/06*   (2012.01)

(52) U.S. Cl.
CPC .... *B60W 30/18027* (2013.01); *B60W 40/068* (2013.01); *B60W 40/06* (2013.01);
(Continued)

(58) Field of Classification Search
CPC ......... B60W 30/18027; B60W 40/068; B60W 2550/402; B60W 2550/12; B60W 2420/54; B60W 40/06; B60W 2420/52
See application file for complete search history.

(56) References Cited

U.S. PATENT DOCUMENTS

2004/0204812 A1   10/2004   Tran
2011/0060478 A1   3/2011    Nickolaou
(Continued)

FOREIGN PATENT DOCUMENTS

GB   2523091   8/2015
GB   2523092   8/2015

OTHER PUBLICATIONS

International Search Report and Written Opinion, PCT/EP2017/066038.
(Continued)

*Primary Examiner* — Yuen Wong
(74) *Attorney, Agent, or Firm* — McCoy Russell LLP

(57) ABSTRACT

The present invention includes a system for use in a vehicle for determining the terrain type in proximity to a vehicle. The system comprises a processor configured to receive primary output data from at least one vehicle-mounted sensor, and secondary output data from a secondary data source; and a data memory configured to store pre-determined primary data relating primary output data for the at least one vehicle-mounted sensor to a particular terrain type, and store at least one data set relating to one or more terrain types. The processor is configured to compare the primary output data with the pre-determined data to determine an
(Continued)

indication of the particular terrain type corresponding to the primary output data, and compare the secondary output data with a data set corresponding to the indication of the particular terrain type.

22 Claims, 9 Drawing Sheets

(52) U.S. Cl.
CPC ..... *B60W 2420/52* (2013.01); *B60W 2420/54* (2013.01); *B60W 2555/20* (2020.02); *B60W 2556/50* (2020.02)

(56) References Cited

U.S. PATENT DOCUMENTS

| | | | |
|---|---|---|---|
| 2014/0257621 A1* | 9/2014 | Zych | G01C 21/3453 701/25 |
| 2015/0123838 A1* | 5/2015 | Shi | H01Q 21/0075 342/70 |
| 2018/0188366 A1* | 7/2018 | Kemmer | A01B 69/008 |
| 2018/0373941 A1* | 12/2018 | Kwant | G08G 1/0129 |

OTHER PUBLICATIONS

Search and Examination Report, GB1611912.5, dated Dec. 16, 2016, 5 pp.

\* cited by examiner

SYSTEM FOR USE IN A VEHICLE

CROSS-REFERENCE TO RELATED APPLICATIONS

This application is a 371 of International Application No. PCT/EP2017/066038, filed Jun. 28, 2017, which claims priority to GB Patent Application 1611912.5, filed Jul. 8, 2016, the contents of both of which are incorporated by reference herein in their entirety.

FIELD OF THE INVENTION

The present invention relates to a system for use in a vehicle and in particular to a system that enables a vehicle to determine an indication of the type of terrain ahead of the vehicle. Aspects of the invention relate to a vehicle system, a method for use in a vehicle, and to a vehicle itself.

BACKGROUND

Many modern vehicles are fitted with systems for sensing the terrain around a vehicle and therefore the surface on which the vehicle is travelling. The vehicle has a number of settings which correspond to terrain types. Current systems with defined system settings for a plurality of different terrain types can be manually set to a terrain type by a user. Alternatively, the sensors may determine characteristics about the terrain over which a vehicle is travelling, and then the most appropriate setting is automatically selected by the vehicle.

International Patent Application Publication Number WO 2015/121108 A1 describes a system which uses at least radar and acoustic sensing to detect the type of terrain over which a vehicle is travelling, and the surface that the vehicle's tyres are in contact with.

In prior art systems, data supplied by the sensors is used to determine the probability that the terrain comprises a particular surface. The settings of the vehicle are then set according to the terrain having the highest probability. A problem arises in such prior art systems when the system cannot accurately determine the terrain or surface on which the vehicle is travelling. For example, when the system suggests that the terrain may be one of a plurality of terrains, wherein the two or more terrains have equal or similar probabilities.

One object of the present invention is to provide a system for use in a vehicle that is able to determine certain characteristics relating to the terrain and surface beneath a vehicle, which addresses the disadvantages of the systems in the prior art.

STATEMENTS OF INVENTION

According to an aspect of the present invention there is provided a system for use in a vehicle for determining the type of terrain in proximity to a vehicle. The type of terrain may comprise or be an indication or determination of the surface of the terrain, and the terrain in proximity to the vehicle may include terrain ahead and/or beneath the vehicle. Preferably, the system comprises a processor configured to receive primary output data from at least one vehicle-mounted sensor, and secondary output data from a secondary data source. The system may comprise a data memory configured to store pre-determined primary data relating primary output data for the at least one vehicle-mounted sensor to a particular terrain type. The data memory may also be arranged to store at least one data set relating to one or more terrain types. Preferably, the processor is configured to compare the primary output data with the pre-determined data to determine an indication of the particular terrain type corresponding to the primary output data. The processor may be arranged to compare the secondary output data with a data set corresponding to the indication of the particular terrain type.

The comparison of the secondary output data with the data set corresponding to the indication of a particular terrain type allows the accuracy of the indication of terrain type to be refined and improved. Accurate knowledge of the terrain type allows the vehicle to be configured for driving over the surface of the terrain type and the associated characteristics of the terrain type, such as the frictional coefficient of the surface.

Accordingly, the invention enables the determination of the terrain type to be verified or rejected. Preferably, the indication of the terrain type is expressed as a percentage confidence. The percentage confidence may be adjusted, for example increased or decreased, as a result of the comparison of the secondary output data with a data set corresponding to the indication of the terrain type.

The indication of the particular terrain type may be validated if the secondary output data falls within a data set corresponding to the indication of the particular terrain type. Accordingly, if the secondary output data falls outside a data set corresponding to the indication of the particular terrain type, the processor may be arranged to decrease the percentage confidence that the indication of the particular terrain type is valid, or reject the determination entirely. Alternatively, if the secondary output data falls within a data set corresponding to the indication of the particular terrain type, the processor may be arranged to increase the percentage confidence.

Each data set may comprise a set of values or ranges which relate to the determined terrain type. For example, if the determination is that the terrain is snow, the system processes the temperature external to the vehicle. The data set for snow will contain a threshold for one or more values, for example temperature. Secondary data containing the external temperature is processed by the system. If the temperature is below a minimum value, say 3° C., then the determination of the terrain type is verified. Conversely, a temperature of more than 3° C. means that the terrain is unlikely to be snow and the user of the vehicle may be notified accordingly.

The pre-determined secondary data, which may comprise one or more data sets relating to one or more terrain types may be stored in the data memory.

Each data set may comprise at least one value and/or range and/or threshold. Preferably, the secondary output data comprises data relating to the external environment of the vehicle. The secondary output data may comprise data relating to the location of the vehicle. The secondary output data may comprise data relating to one or more of: the location of the vehicle; the altitude of the vehicle; the weather; humidity; precipitation and the temperature external to the vehicle.

In a preferred embodiment of the invention, the secondary data source comprises a wireless data receiver which may receive data from a remote server. The remote server may be arranged to send data to the vehicle wirelessly For example, the remote server may comprise a remote database which provides remote information in respect of the terrain at the vehicle's location. The remote information may include information provide by other vehicles which were recently at the location, or the weather at the vehicle's location.

The secondary data source may comprise one or more of a thermometer; a GPS device; a high definition (HD) map; humidity sensor; and rain sensor.

Preferably, the system may adjust the determination by using secondary data obtained from a plurality of secondary data sources.

In a preferred embodiment of the invention, the at least one vehicle-mounted sensors include at least one radar sensor and at least one acoustic sensor, each for receiving a reflected signal from the terrain beneath and/or ahead of the vehicle.

The system preferably comprises a human-machine interface (HMI) device enabling communication of the verification of the terrain type to the user.

The data memory may be arranged to enable inputting the adjusted determination of the terrain type in the data memory together with parameters corresponding to the primary output data to supplement the pre-determined data as part of a self-learning process.

The data memory may be arranged to enable inputting the adjusted determination of the terrain type in the data memory together with one or more data sets corresponding to the primary output data to supplement the pre-determined data as part of a self-learning process.

The processing means may be arranged to analyse parameters relating to primary output data and clustering the primary output data into a plurality of clusters, wherein each cluster corresponds to a different terrain type. Preferably, the processor is configured to determine to which one of the clusters the primary output data belongs so as to determine an indication of the terrain type. The system may associate one or more clusters with one or more data sets relating to one or more terrain types.

Preferably, once adjustment of the determination of the terrain type has taken place, the system may be arranged to control at least one vehicle subsystem in dependence on the adjustment. Accordingly, once the terrain type has been verified, the vehicle may be configured accordingly.

In embodiments of the invention in which the vehicle-mounted primary sensors include at least one radar sensor and at least one acoustic sensor, the combination of sensor output data from both a radar sensor and an acoustic sensor can result in greater distinction between the characteristics of parameters relating to primary output data for certain terrain types in which parameters relating to primary output data are poorly distinguished by use of one type of sensor only. In addition, radar and acoustic sensors are not affected by different weather conditions.

The processor may be further configured to receive primary and/or secondary output data from at least one optical sensor mounted on the vehicle and/or at least one infrared sensor mounted on the vehicle. The use of, in particular, primary output data from a greater number of different types of sensor may result in even greater distinction between the characteristics of parameters relating to certain terrain types, thus improving the accuracy of the determined indication of the particular terrain type to which the primary output data corresponds. Coupled with the adjustment and verification, if appropriate, made by comparison with the secondary data, the invention provides a high degree of accuracy in determining the terrain type.

The HMI may be configured to enable communication of the verified terrain type to the user. The HMI may be further configured to enable user-input in relation to the terrain type following determination and adjustment of the determination of the terrain type by the user.

The processor may be configured to receive the user-input in relation to the terrain type and, in dependence upon the user-input, to provide a terrain type to the data memory together with primary output data corresponding to the terrain type to supplement the pre-determined data as part of a self-learning process. In addition, or alternatively, the processor may be configured to input the determined terrain type to the data memory together with parameters corresponding to the primary output data to supplement the pre-determined data as part of a self-learning process.

The pre-determined data may therefore be added to and updated using real-time primary output data, enhancing the prospect of the vehicle control system accurately determining an indication of the terrain type ahead of the vehicle in a subsequent determination loop.

In one embodiment, the processor is configured to receive primary output data from the or each radar sensor in the form of a received horizontally polarised signal representative of power in a received horizontal polarisation component of a radar signal reflected from the terrain ahead of the vehicle. In addition, or alternatively, the processor may be configured to receive a vertically polarised signal representative of power in a received vertical polarisation component of a radar signal reflected from the terrain ahead of the vehicle. The processor may be further configured to determine a horizontal (or vertical) polarisation power signal, that is the power of the received horizontally (or vertically) polarised signal from a horizontally (or vertically) polarised transmitter. The processor may also be configured to determine a cross polarisation power signal, that is the power of the received horizontally polarised signal from the vertically polarised transmitter (or power of the received vertically polarised signal from the horizontally polarised transmitter).

In one embodiment, the processor is configured to receive primary output data from the or each radar sensor in the form of a received elliptically polarised signal, optionally a received circularly polarised signal. The processor may be further configured to determine a cross polarisation power signal, that is the power of a received clockwise-rotating elliptically polarised signal from a transmitted anticlockwise-rotating elliptically polarised signal, or the power of a received anticlockwise-rotating elliptically polarised signal from a transmitted clockwise-rotating elliptically polarised signal. There are certain types of terrain which are particularly sensitive to elliptically polarised signals and so this may prove to be a useful parameter when determining certain terrain types. Note from above that "cross polarisation" may refer to either the received horizontal (or vertical) signal from the transmitted vertical (or horizontal) signal or the received clockwise- (or anticlockwise-) rotating signal from the transmitted anticlockwise- (or clockwise-) rotating signal.

In one embodiment, the processor is configured to determine the ratio of any two of the horizontal polarisation power signal, the vertical polarisation power signal, and the cross polarisation power signal. Use of the relative values obtained by determining the abovementioned ratios is advantageous over the use of absolute values of the parameters since relative values depend to a lesser extent on the signal power from a transmitter and also the distance from the transmitter to the target terrain, i.e. they are less dependent upon signal attenuation.

In one embodiment, the processor is configured to compare one or more of the determined ratios with a corresponding pre-determined ratio for a plurality of different terrain types, and is configured to determine an indication of the terrain type on the basis of the comparison.

In one embodiment, the processor is configured to receive primary output data from the or each acoustic sensor in the form of an acoustic power signal representative of power in an acoustic signal reflected from the terrain ahead of the vehicle. The processor may be further configured to determine a ratio of the acoustic power signal with one or more of the horizontal polarisation power signal, the vertical polarisation power signal, and the cross polarisation power signal. The processor may then compare the determined ratio with a corresponding pre-determined ratio for a plurality of different terrain types, and determine an indication of the terrain type on the basis of the comparison.

The processor may be configured to analyse parameters relating to primary output data using a mathematical technique. For example, the processor may be configured to analyse the sensor output data by clustering the sensor output data into a plurality of clusters, where each cluster corresponds to a different terrain type. In one embodiment, the processor is configured to use a 'k-means' algorithm to analyse the data or, alternatively, the processor may be configured to use a 'k-nearest neighbour' algorithm to analyse the data.

The values of parameters relating to primary output data for a given terrain type can be significantly different between measurements; however, the use of a clustering algorithm allows certain characteristics common to each measurement for a given terrain to be extracted from the primary output data.

In one embodiment the processor is configured to determine to which one of the clusters the primary output data belongs so as to determine an indication of the terrain type. For example, the processor may be configured to use a Euclidean algorithm to determine to which one of the clusters the primary output data belongs.

The system may, but need not, include the transmitters of the acoustic and radar signals themselves. For example, the vehicle system may include at least one acoustic transmitter for transmitting an acoustic signal to the terrain ahead and at least one acoustic sensor for sensing a reflected signal of the acoustic signal from the terrain ahead, and at least one radar transmitter for transmitting a radar signal to the terrain ahead and at least one radar sensor for sensing a reflected signal of the radar signal from the terrain ahead. The acoustic transmitter and the acoustic sensor may form part of a single unit. Likewise, the radar transmitter and the radar sensor may form part of a single unit.

The system may comprise means configured to transmit radar signals at orthogonal horizontal and vertical polarisations, and may further comprise means configured to transmit radar signals with a circular or elliptical polarisation. In addition, the system may comprise means configured to transmit radar signals at two or more frequencies.

In another embodiment, the system includes means configured to control at least one vehicle subsystem in dependence on the adjusted determination of the terrain type.

According to another aspect of the invention, there is provided a method for implementing the vehicle system capabilities described above to enable the vehicle system to determine an indication of the terrain type and adjust the determination.

According to another aspect of the invention, there is provided a method for refining and improving the accuracy of a determination of the terrain in proximity to a vehicle. The invention enables the terrain type beneath and/or ahead of the vehicle to be more accurately determined over systems of the prior art. Preferably, the method comprises receiving primary output data from at least one vehicle-mounted sensor, and may also comprise receiving secondary output data from a secondary data source. The method may comprise storing pre-determined primary data relating to the primary output data, for the at least one vehicle-mounted sensor, to a particular terrain type. The method may comprise comparing the primary output data with the pre-determined primary data to determine an indication of the particular terrain type corresponding to the primary output data. The method may comprise receiving secondary output data from a further data source. The secondary output data may be used to refine and/or adjust the determination of the terrain type to improve its accuracy. Accordingly, the method may comprise comparing the secondary output data against a data set corresponding to the indication of the particular terrain type. The data set may contain at least a value or range relating to the determined indication of the particular terrain type.

The method may comprise adjusting the indication of the particular terrain type in response to the comparison of the secondary output data with a data set corresponding to the indication of the particular terrain type. The indication of the particular terrain type may be expressed as a percentage confidence. Accordingly, the method may comprise adjusting the percentage confidence in response to the comparison of the secondary output data with a data set corresponding to the indication of the particular terrain type. The method may comprise decreasing the percentage confidence of the indication of the particular terrain type if the secondary output data falls outside a data set corresponding to the indication of the particular terrain type. The method may comprise increasing the percentage confidence if the secondary output data falls within a data set corresponding to the indication of the particular terrain type.

In a preferred embodiment of the invention, the secondary output data falling within the data set may confirm that the indication of the particular terrain type is valid. The method may comprise storing pre-determined secondary data relating to the secondary output data to one or more data sets relating to one or more terrain types. Preferably, each data set comprises at least one value and/or range.

The method preferably enables communication of the refined indication of the terrain type to the user.

The verified terrain type may be inputted into a data memory together with parameters corresponding to the primary sensor output data to supplement the pre-determined data as part of a self-learning process.

The method may comprise analysing parameters relating to primary output data and clustering the primary output data into a plurality of clusters, wherein each cluster corresponds to a different terrain type. Furthermore, the method may comprise determining which one of the clusters the primary output data belongs so as to determine an indication of the terrain type. Preferably, one or more data clusters are associated with a data set.

The method may further comprise controlling at least one vehicle subsystem in dependence on the verification of the terrain type.

In a further embodiment, there is provided a data memory containing a computer readable code for performing the method described above.

According to another aspect of the invention, there is provided a vehicle comprising a vehicle control system as described above.

In one embodiment, the present invention has the advantage of simply requiring existing systems on a vehicle to be modified (for example, GPS systems and external thermometers), and so does not incur additional cost to the user and does not require extra equipment that may add extra weight or take up more space in a vehicle. Alternatively, dedicated equipment, such as additional GPS devices and thermometers, may be used.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. For example, features disclosed in connection with one embodiment are applicable to all embodiments, except where such features are incompatible.

BRIEF DESCRIPTION OF DRAWINGS

The invention will now be described, by way of example only, with reference to the accompanying figures in which.

DETAILED DESCRIPTION

In the present invention, data relating to the terrain in proximity to a vehicle is collected from a plurality of different types of sensors on a vehicle for a plurality of different parameters.

Figure 1:
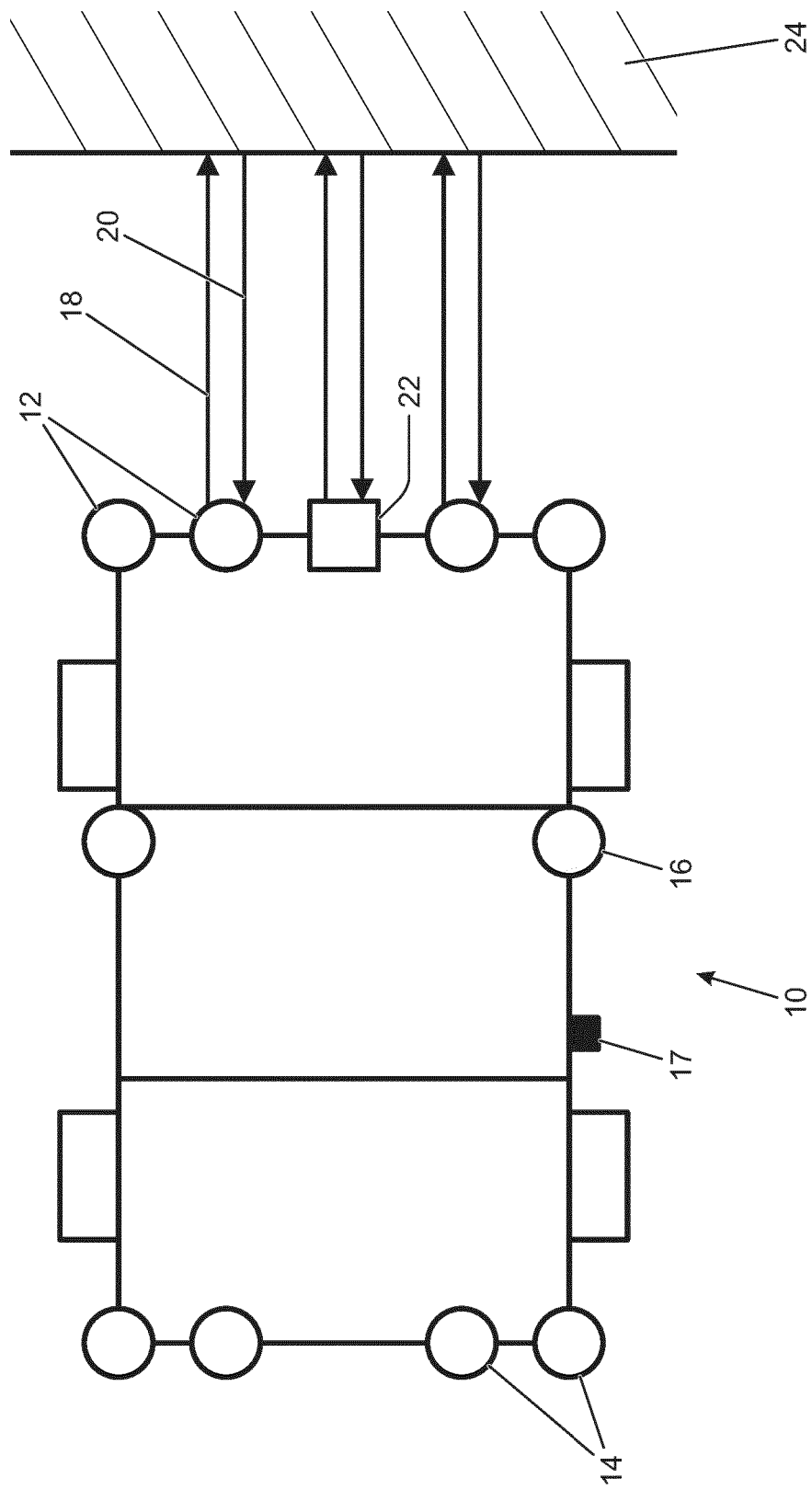
FIG. 1 is an overhead view of a vehicle and of terrain ahead of the vehicle.

FIG. 1 shows one embodiment of a vehicle 10 with sensors that collect data to be input to different systems of the vehicle. In current systems, there may be acoustic sensors positioned at the front 12, rear 14 and/or side 16 of the vehicle: commonly, acoustic sensors are used to send and receive acoustic signals to collect sensor output data to be input to, for example, parking assistance systems of the vehicle. The acoustic sensors may be ultrasound sensors. The vehicle comprises an external thermometer 17 to detect the temperature external to the vehicle 10.

Typically, parking assistance systems are used to warn a vehicle user, either by visual or audible means, of the vehicle's proximity to an obstacle. In the case of an audible warning, a warning tone may sound with increasing frequency as the obstacle becomes closer to the vehicle. The acoustic sensors used for parking assistance systems are typically able to detect obstacles at short-range (0.25-1.5 metres) but at a wide angle from the direction in which the sensor is pointed. The parking assistance system may transmit acoustic pulses 18 and then receive back any reflected signal 20 from an obstacle, which may then be processed to calculate the distance between the vehicle and the obstacle.

Also in current systems, there may be a radar sensor 22 positioned at the front of the vehicle 10: commonly, radar sensors are used to send and receive radar signals to collect sensor output data to be input to, for example, adaptive cruise control (ACC) systems. In an ACC system, the time between a radar signal being sent and then received back is measured, and then the time interval to a vehicle in front is calculated. This information is sent to other systems of the vehicle (throttle control, brake control etc.) and the necessary action is taken to maintain a constant time interval to the vehicle in front. The radar sensors in an ACC system are typically able to detect an obstacle up to about 150 metres in front of the vehicle but at a narrow angle from the direction in which the sensor is pointed; other ACC systems may use shorter range, wider angle radars, or a combination of both.

Radar sensors may be positioned at other locations on the vehicle to collect sensor output data to be input to, for example, blind spot detection (BSD) systems, lane departure warning systems, or speed-gun detector systems (none of which are shown). FIG. 1 also shows the terrain 24 ahead of the vehicle.

Figure 2:
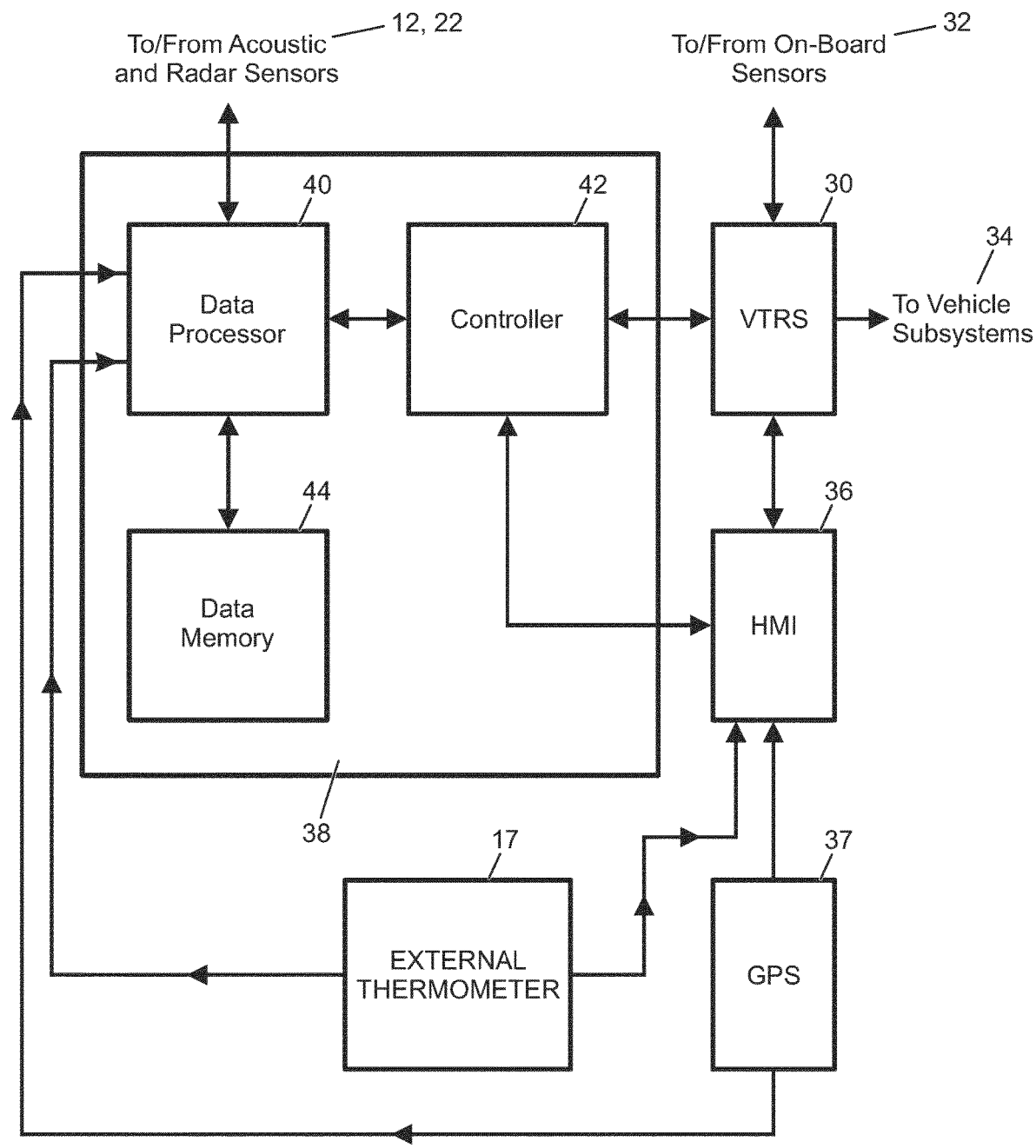
FIG. 2 is a diagram showing the component parts of a vehicle control system (VCS), together with the inputs to, and outputs from, the VCS.

Referring to FIG. 2, in some current vehicles a vehicle system is configured to improve the riding experience of the vehicle user; for example, a vehicle control system (VCS) in the form of a vehicle terrain response system (VTRS) 30, such as a Terrain Response® system, receives sensor output data from one or more on-board sensors 32 (such as a wheel speed sensor, tyre pressure sensor, vehicle speed sensor, brake pedal position sensor, suspension articulation, acceleration, wheel slip, pitch rate, and yaw rate) relating to the terrain over which the vehicle 10 is currently travelling, processes the data, and sends control signals via a controller to one or more subsystems 34 (such as a suspension system, traction-control system, stability-control system, engine torque system, or ride height system) so as to allow adjustment of the setup of the vehicle 10 accordingly. The controller also communicates with a human machine interface (HMI) 36 which incorporates a display. Via the HMI display, the user receives alerts or advice, relating to a host of vehicle systems, for example, in-vehicle entertainment systems. As shown in FIG. 2, the HMI 36 receives data from a GPS device 37 and the external thermometer 17 which may be displayed on the HMI 36. The HMI 36 typically includes a touch-screen keyboard, dial, or voice activation to enable user selection of a particular input for the various vehicle systems which can be controlled.

In a vehicle incorporating the VTRS 30, in response to a user-input via the HMI 36, a control signal is sent via a controller of the VTRS 30 to the one or more vehicle subsystems 34 to adjust the vehicle setup, according to the terrain type over which the vehicle is travelling. Alternatively, the VTRS 30 may adjust the vehicle setup automatically by sending a control signal to the vehicle subsystems 34 in response to the on-board sensor output data 32. The VTRS 30 may also send alerts to the vehicle user, via the HMI 36, to adjust his/her driving style (for example, to reduce the vehicle speed), according to the terrain type over which the vehicle is travelling. Details of how the setup may be adjusted via the VTRS 30 are described in UK patent application GB2492655.

In one embodiment of the present invention, a separate VCS 38 includes: a data processor 40 that receives sensor output data from the external thermometer 17, acoustic and radar sensors 12, 22, and the GPS device 37; a VCS controller 42 for sending and receiving signals from the HMI 36 and/or VTRS 30; and a data memory 44 for storing external thermometer 17, acoustic and radar sensor output data.

The VCS 38 determines an indication of the terrain type ahead of the vehicle 10 using sensor output data that is collected in real-time for a plurality of different parameters relating to characteristics of the target terrain from the acoustic and radar sensors 12, 22. The VCS controller 42 will then send a control signal to either the VTRS 30 to adjust the vehicle setup accordingly, or the HMI 36 to prompt the user to input the determined terrain type to the VTRS 30. Here and throughout, the term "determine" should be interpreted to mean "makes a best estimation of".

In more detail, the data processor 40 of the VCS 38 receives sensor output data from both the acoustic and radar sensors 12, 22. The data processor 40 is responsible for associating the received sensor output data to a particular terrain type which it does by retrieving pre-determined information from the data memory 44 for comparison with the sensor output data. Upon determination of the terrain, the data processor 40 communicates with the VCS controller 42, which is responsible for sending control signals to the HMI 36 relating to the determined terrain type. It will be appreciated that, although the processor 40 and controller 42 are shown as independent components, they may comprise a single electronic controller.

Figure 3:
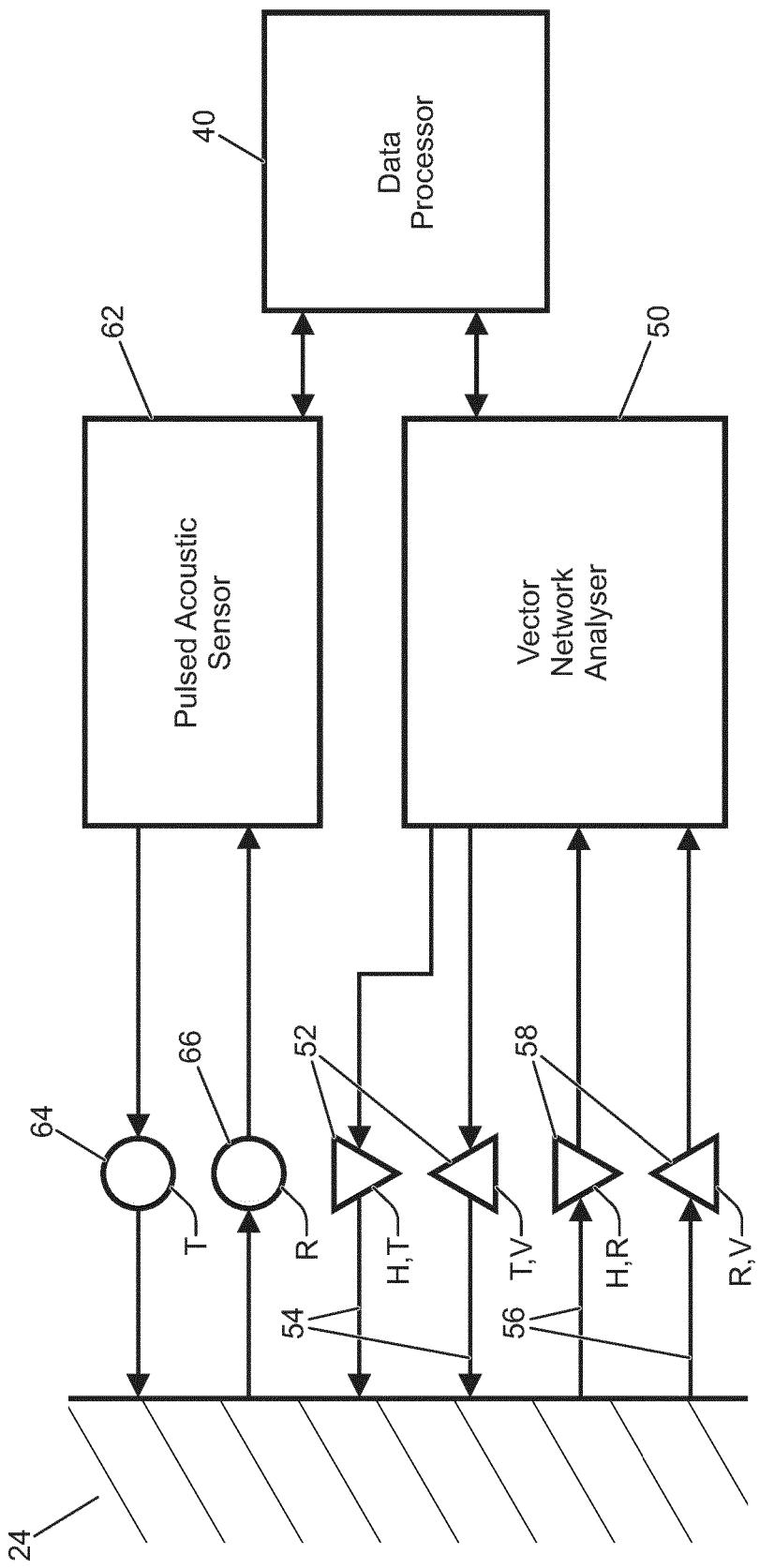
FIG. 3 is a diagram showing acoustic and radar sensors of the vehicle in FIG. 1 and means for processing output signals from those sensors.

FIG. 3 is a diagram showing acoustic and radar sensors of the vehicle 10 in FIG. 1 and the data processor 40 for processing output signals from those sensors. In this embodiment, both radar and acoustic sensors 12, 22 are used to collect sensor output data relating to the terrain ahead of the vehicle 10. Both radar and acoustic sensor output data is used because data from one type of sensor may be advantageous over the other in certain situations.

In this embodiment, the radar signals are generated by a Vector Network Analyser (VNS) 50, transmitted at orthogonal (in particular, horizontal and vertical) polarisations by a pair of transmitting antennas 52, reflected by the terrain 24 ahead of the vehicle which alters the polarisation of the transmitted signals 54, and then the backscattered signals 56 are collected by a pair of receiving antennas 58 at orthogonal polarisations. Note that a VNA 50 is used only in the experimental stage and that a dedicated hardware sensor will eventually be used. The radar sensor units may form part of the vehicle ACC system because of the similar operation and structure of the sensor units required for both purposes.

The radar sensors 22 may be used to characterise the, for example, roughness, wave absorption, or polarisation properties of a given terrain type and, in particular, may be used to detect an area of low friction caused by, for example, water, ice, or wet grass. The roughness of a given terrain type may be characterised using radar signals by analysing the backscattering properties of the wave at different polarisations. In particular, the absolute measured values include: the vertical polarisation signal power, that is the power of a received vertically polarised signal from a vertically polarised transmitter; the horizontal polarisation signal power, that is the power of a received horizontally polarised signal from a horizontally polarised transmitter; and the cross polarisation signal power, that is the power of a received horizontally polarised signal from a vertically polarised transmitter, or vice versa. The reflection of the radar signal from the terrain causes some changes to the polarisation to produce some horizontal component from a vertically polarised transmitted signal. In this way, a measure is made of the amount of the signal power of one polarisation that has had its polarisation shifted.

The transmitting antennas 52 may be further configured to generate an elliptically polarised signal. This may be achieved by transmitting the same signal with vertical polarisation and horizontal polarisation delayed in phase by a quarter wavelength. If the signals have the same power then the generated elliptically polarised signal is a circularly polarised signal, a circularly polarised signal simply being a special case of an elliptically polarised signal.

An elliptically (or circularly) polarised signal may be generated to rotate in either a clockwise or an anticlockwise direction, depending on how the transmitting antennas 52 are arranged. A transmitting antenna capable of transmitting both clockwise and anticlockwise signals will generally consist of one vertical antenna sandwiched between two horizontal antennas (or vice versa) and each separated by a quarter wavelength. In this case, a further absolute measured value may be the power of a received anticlockwise-rotating elliptically polarised signal from a clockwise-rotating elliptically polarised signal (or vice versa), and this is referred to as the cross polarisation signal power. Note from above that "cross polarisation" may refer to either a received horizontal (or vertical) signal from a transmitted vertical (or horizontal) signal or a received clockwise- (or anticlockwise-) rotating signal from a transmitted anticlockwise- (or clockwise-) rotating signal. Similarly to above, the reflection from the terrain may change the polarisation of a clockwise- (or anticlockwise-) rotating elliptically polarised signal to produce an anticlockwise- (or clockwise-) rotating component.

The radar signals 54, 56 may be transmitted and received at a plurality of different frequencies; however, for example, in the automotive industry the currently licensed bands for short-range radar are restricted to 21.65-26.65 GHz and 76-81 GHz. Note that other unlicensed frequency bands may also be considered.

The amplitude and phase of the received signals 56 are recorded by the VNS 50. These are then processed to obtain, for example, average signal powers, or reflection from a fixed area of terrain ahead of the vehicle. Relative signal powers are analysed because they are less affected by transmitter power and distance than absolute values. Relative parameters include (but are not restricted to): the ratio of the vertical polarisation signal power to the horizontal polarisation signal power; the ratio of the horizontal polarisation signal power to the vertical polarisation signal power; and the ratio of the cross polarised signal power to the horizontal polarisation signal power. Note that absolute values of signal power can be used to provide extra data; however, these values may not be as useful as relative values of signal power.

In this embodiment, the acoustic signals are sent by a pulsed acoustic sensor 62 through a transmitting antenna 64 and the backscattered signal, received through a receiving antenna 66, is measured for energy, duration, range and/or another property of the signal by the pulsed acoustic sensor 62. The data processor 40 processes the received signal to, for example; appropriately scale the signal, to account for path loss, to average the signal in time, and/or to compare against signals in different conditions (such as different weather conditions). The acoustic sensor 62 may also measure the relative backscattered signals from several range cells over the range of the transmitted signal then analyse the characteristics of the different cells. In other words, the relative backscattered signals can be gated in time to provide swathes of data to be analysed.

The acoustic sensor units form part of the vehicle parking assistance system because of the similar operation and structure of the sensor units required for both purposes. The acoustic sensor 62 may be used to characterise the, for example, roughness, texture, or sound absorption of a given terrain type. The optimum frequency in terms of cost and attenuation through the atmosphere is 40-50 kHz, and acoustic sensors on current vehicles operate at typically 51.2 kHz.

At the point of vehicle manufacture, the VCS 38 goes through a calibration process whereby calibration data obtained from offline measurements is stored on the data memory 44 of the VCS 38 for use in a real-time determination process. Once calibrated, the VCS 38 is used to determine an indication of the terrain ahead of the vehicle 10 by analysing sensor output data and comparing this with the calibration data to determine the particular terrain type. In addition, as well as the real-time determination process, a real-time training or self-learning process is implemented on the VCS 38.

Figure 4:
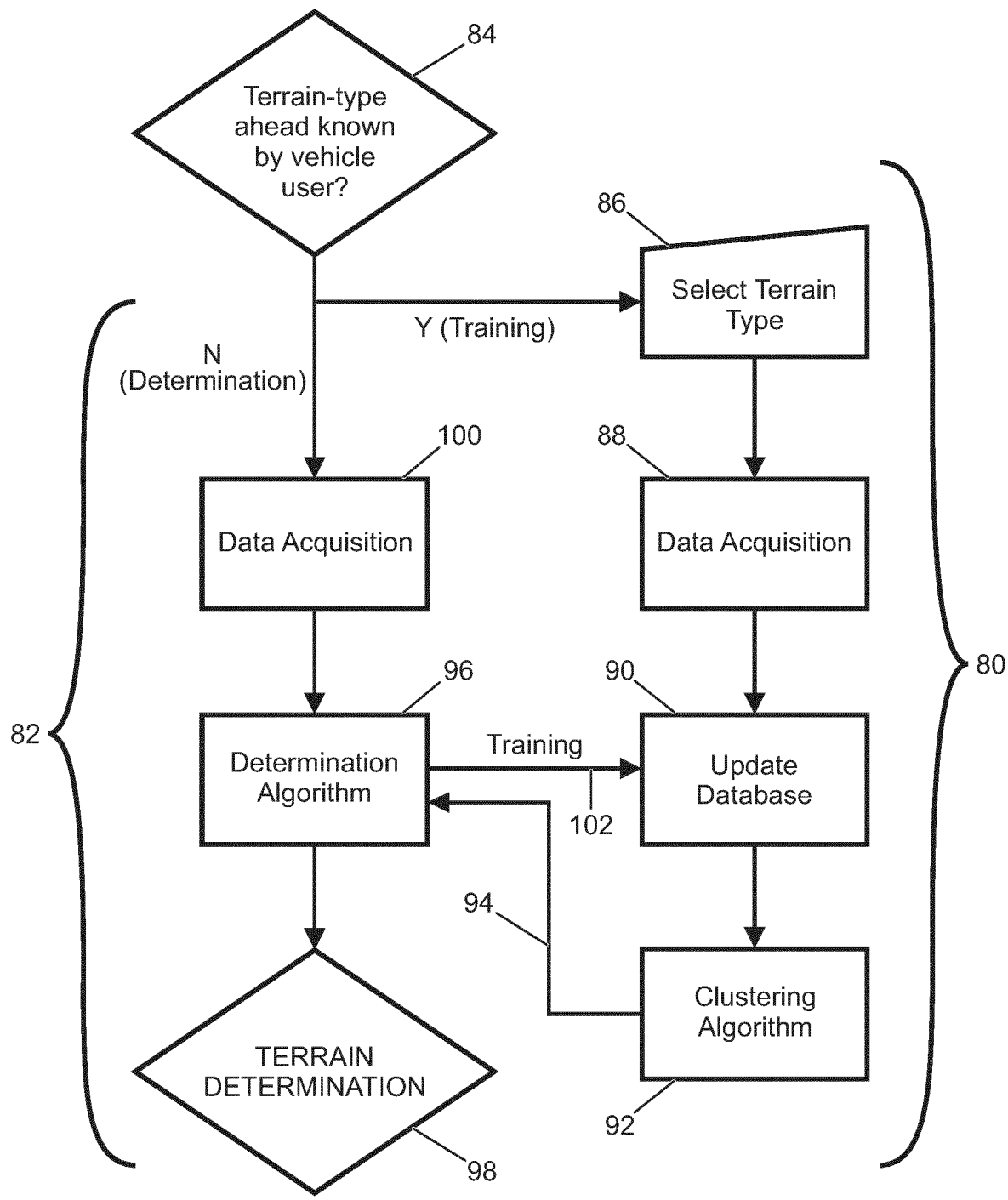
FIG. 4 is a flow diagram which illustrates a process according to an embodiment of the invention for both determining an indication of the particular terrain ahead of the vehicle in FIG. 1 when the terrain type is unknown, and training the VCS as to the characteristics of a set of parameters relating to a particular terrain type.

FIG. 4 illustrates the steps of both the training or self-learning process 80 and the determination process 82 for a calibrated system. If the terrain type ahead of the vehicle 10 can be determined by the user then the self-learning process occurs; whereas, if the terrain type ahead of the vehicle 10 cannot be determined by the user then the determination process occurs. In the latter case, the VCS 38 may be trained (or may self-learn) in conjunction with the determination process 82 to enhance subsequent situations in which terrain determination is required. Specifically, when sensor output data has been associated with a given terrain type during the determination process 82, this information may be used to update the calibration data. In this way the VCS 38 is continuously updated. It will be appreciated that the use of a user input is optional only and proving sufficient data is stored in the memory to sufficiently define the clusters, although it may be desirable to increase, over time, the accuracy of the data on which the determination is made, it is not necessary for the invention.

As a first step 84 in the process, a determination is made regarding whether the user can determine the terrain ahead. This may be implemented by a query appearing on the HMI display 36 in the form of, for example, "TERRAIN TYPE?" In order to select a particular terrain type at step 86, the user may be presented with a list of possible terrain types from which a selection may be made via the HMI 36.

The self-learning process 80 collects sensor output data for a plurality of parameters for a plurality of different terrain types and uses mathematical techniques to cluster the parameters. So, for example, if the user determines a patch of ice ahead of the vehicle 10, the user inputs "ICE" to the VCS 38 via the HMI 36 at step 86. The sensor output data that has been obtained for the terrain ahead is associated with "ICE" at step 88 and the data is saved in the data memory 44 at step 90.

The data is then subjected to a clustering algorithm at step 92, as described in further detail below. The output 94 from the clustering algorithm at step 92 is input to a determination algorithm 96, which also forms a part of the determination process 82, as described below. Once these steps have been completed, a terrain determination 98 is formed. The terrain determination is expressed as a percentage confidence. For example, if the terrain type is determined as sand with a percentage confidence of 98%, this is deemed a high percentage confidence. Alternatively, a percentage confidence of 12% is considered a low percentage confidence.

If there is no user-input following the query step 84, the processor by-passes the self-learning process 80 and proceeds directly to a data-acquisition step 100 which collects the sensor output data and passes this through the determination algorithm step 96. The processed sensor output data collected in step 100 is used to update the database of the data memory 44 at step 90 for a plurality of parameters for each terrain type.

The sensor output data is then passed through the clustering algorithm 92, as described below, and is returned through the determination algorithm 96. Since the sensor output data is passed through the clustering algorithm 92 and returned to the determination algorithm 96, the determination algorithm 96 is therefore updated, and this updated determination algorithm 96 is then used for the next real-time determination event 82. In summary, therefore, the differences in the characteristics of the collected sensor output data for different terrain types are exploited to determine an unknown terrain type ahead of the vehicle, and this collected sensor output data is used to update the VCS 38.

As an alternative, the system may make the determination without the benefit of user input of the terrain type and temporarily store the sensor output data. The system may then communicate to the user the determination of the terrain type made and ask the user, via for example the HMI, to verify that the determination was correct. If the answer is in the positive then the system may write the temporarily stored data to a data memory.

Once a cluster corresponding to a particular terrain type has a pre-determined number of data points, the system may prevent writing further data points for that particular terrain type to the data memory.

Figure 5:
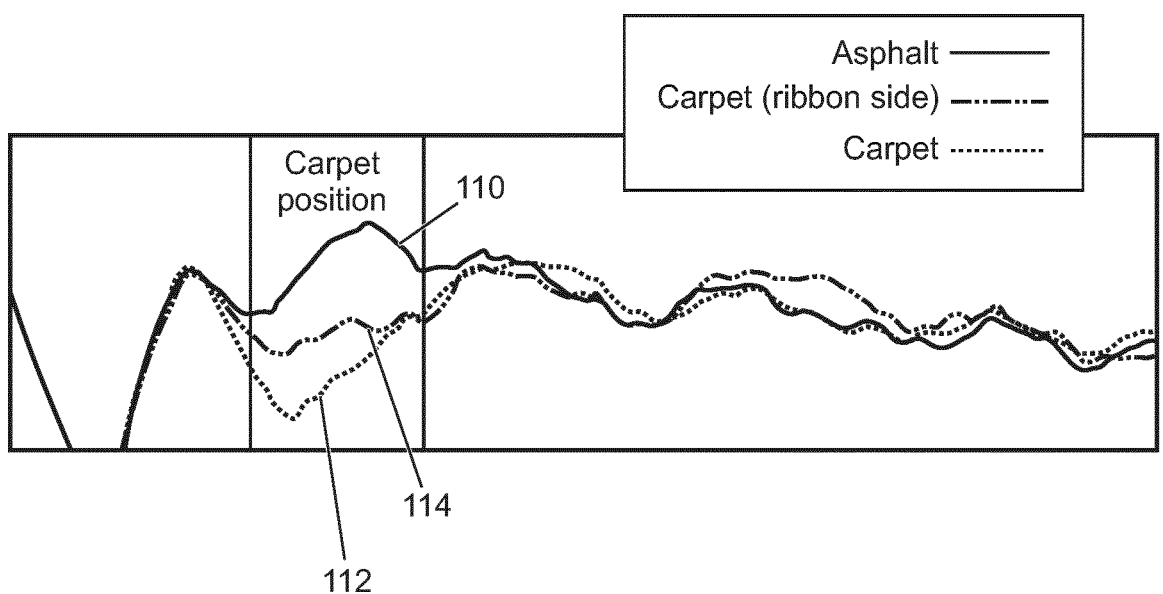
FIG. 5 shows the amplitude of a received acoustic signal from three different terrain types to illustrate the different characteristics of those terrain types.

Differences in the characteristics of the collected sensor data are shown in detail in FIG. 5 which shows the amplitude of a received acoustic signal from three different terrain types (in this case: asphalt 110, carpet 112, and the underside of carpet 114) and, in particular, shows that the received signal amplitude is different for each terrain type. Hence, the amplitude of a received acoustic signal is one example of a parameter that may be used to determine the terrain type.

Figure 6:
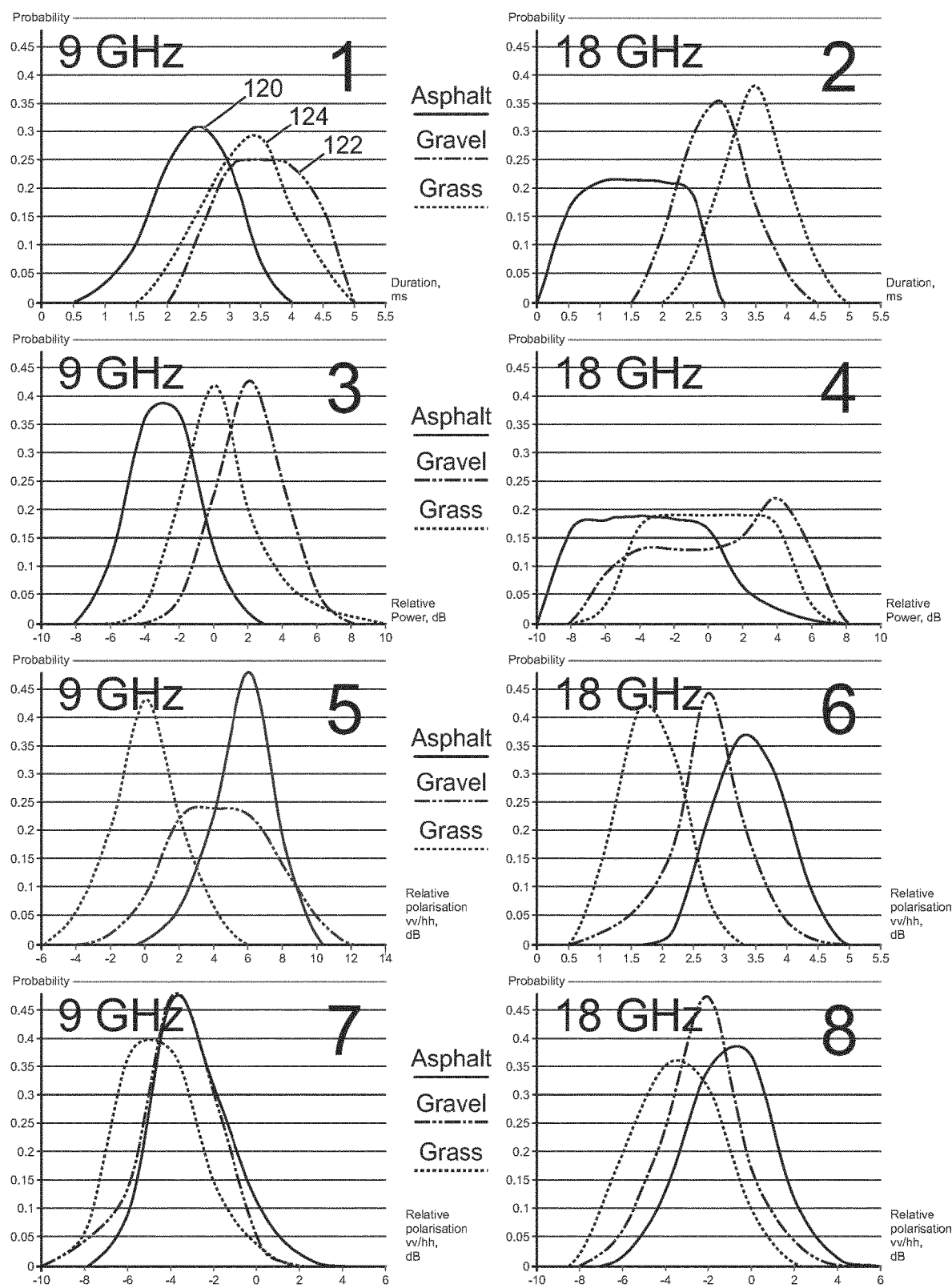
FIG. 6 shows histograms of power distribution for different parameters for two different frequencies of a received radar signal reflected from three different terrain types.

The optimal set of parameters may be regarded as those which display the greatest differences in the sensor output data between different terrain types. FIG. 6 shows histograms of power distribution for different parameters for two different frequencies of a received radar signal for three different terrain types: in this case, asphalt 120, gravel 122 and grass 124. In particular, FIGS. 6(1) and 6(2) show the backscatter signal duration, FIGS. 6(3) and 6(4) show the average relative power of a vertically polarised transmitted signal to a vertically polarised received signal, FIGS. 6(5) and 6(6) show the ratio of the vertical polarisation signal power to the horizontally polarised signal power, and FIGS. 6(7) and 6(8) show the ratio of the cross polarised signal power to the horizontally polarised signal power. In addition, FIGS. 6(1), 6(3), 6(5) and 6(7) are for a 9 GHz radar signal and FIGS. 6(2), 6(4), 6(6) and 6(8) are for an 18 GHz radar signal. The optimal parameters may then be chosen based on the independence and contrast between each curve on each plot. Note that the optimal parameters are pre-determined and stored in the data memory 44.

Figure 7:
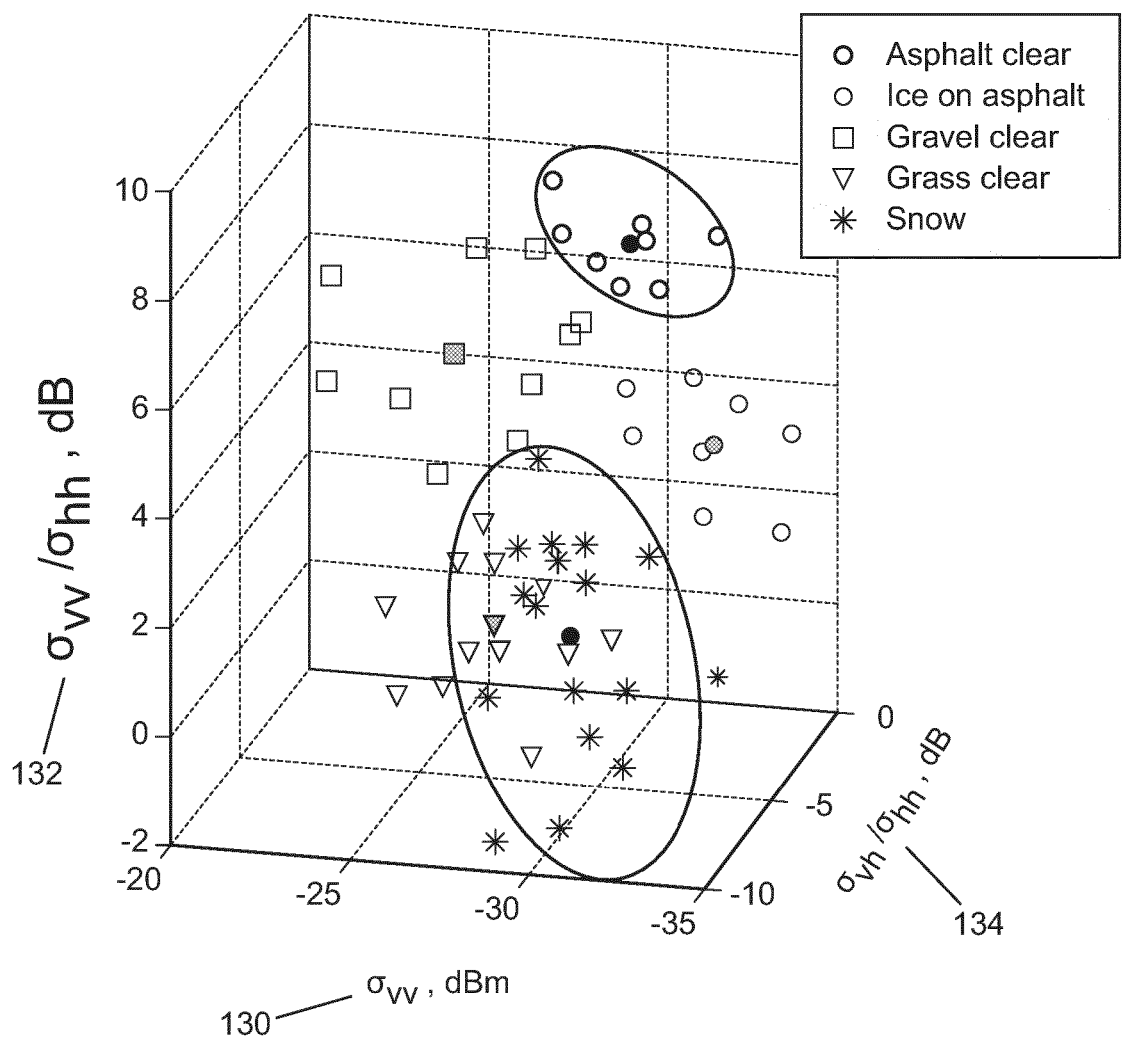
FIG. 7 shows a three-dimensional plot of parameters relating to the received radar signal in FIG. 6 reflected from five different terrain types, namely asphalt, ice on asphalt, gravel, grass and snow.
Figure 8:
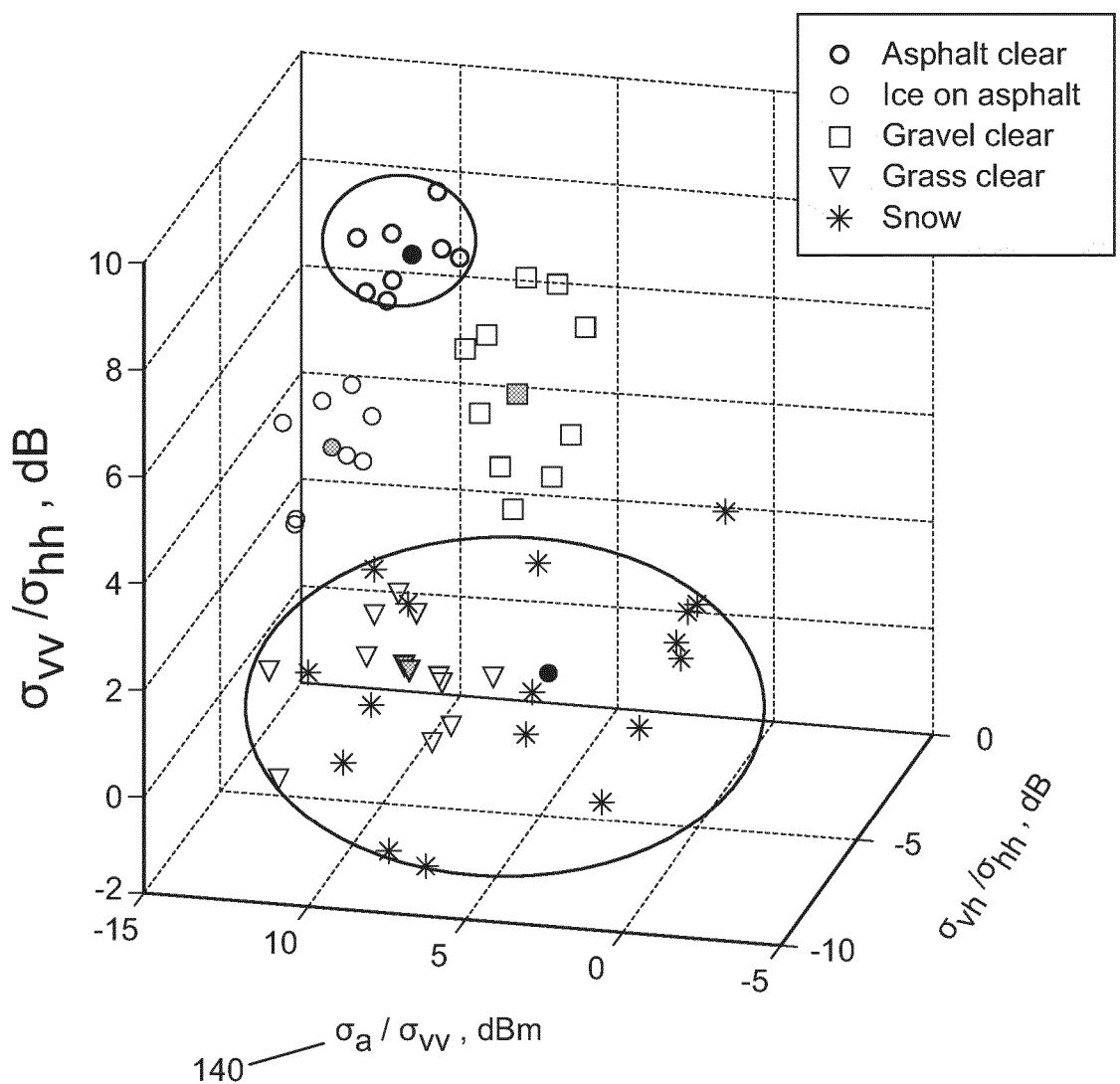
FIG. 8 shows a three-dimensional plot of parameters relating to the received radar and acoustic signals in FIG. 6 reflected from the same five terrain types as in FIG. 7.

In this embodiment, the combination of both radar and acoustic signals improves the distinction between different terrain types that are poorly distinguished by using radar signals only: this is illustrated using FIGS. 7 and 8. FIG. 7 shows a three-dimensional plot of parameters relating to the received radar signal for five different terrain types; namely, clear asphalt, ice on asphalt, clear gravel, clear grass, and snow. The three parameters plotted are the vertical polarisation radar signal power 130, the ratio of the vertical polarisation signal power to the horizontally polarised signal power 132, and the ratio of the cross polarised signal power to the horizontally polarised signal power 134.

FIG. 8 shows a similar plot to that in FIG. 7; however, in FIG. 8 parameters from both radar and acoustic received signals are plotted. In particular, rather than the vertical polarisation signal power 130 plotted in FIG. 7, the ratio of the acoustic signal power to the vertical polarisation signal power 140 is plotted in FIG. 8, and it is seen that there is greater distinction between the clusters in the case where the acoustic signal is utilised.

The clustering and determination processes applied to the sensor output data will now be described in further detail.

Referring back to step 92 in FIG. 4, a mathematical technique is used to cluster the sensor output data relating to each terrain type so as to elucidate certain characteristics associated with each terrain type.

The requirements of any mathematical technique used at step 92 are to discover clusters with complex shapes, deciding whether complex-shaped clusters are indeed more than one discrete cluster, to be able to deal with noise or outlying data points, and to be able to deal with a large number of parameters.

The well-known 'k-means' algorithm may be used to cluster sensor output data based on each data point being assigned to the cluster with the nearest mean. In this method, n data points are divided into k clusters to minimise the sum of squares in each cluster, where k may take any value less than or equal to n. In practice, the number of clusters will be pre-determined and stored in the data memory 44.

Alternatively, the well-known 'k-nearest neighbour' (k-NN) algorithm may be used to cluster sensor output data based on the sum of distances to each of a pre-determined number of neighbouring data points in each cluster. A smaller number of clusters leads to noise having a large effect on the result and a large number of clusters leads to the algorithm being computationally expensive.

The skilled reader will understand that there are many well-known cluster analysis algorithms available that could be used rather than the two mentioned above.

The determination process 82 collects sensor output data 100 for a plurality of parameters for an unknown terrain type ahead of the vehicle then uses some metric at step 96 to determine to which stored cluster the collected data point belongs (where each stored cluster corresponds to a different terrain type) and thereby determines makes the terrain determination type at step 98.

In one embodiment, at the determination algorithm step 96 the collected parameters are used to construct a data point in k-dimensional space and the data point is assigned to a defined cluster. This may be done by calculating the Euclidean distance $$d(x, y) = \left( \sum_{i=1}^{n} (x_i - y_i)^2 \right)^{\frac{1}{2}}$$

from the collected data point to the mean point in each cluster, where the collected data point is assigned to the appropriate cluster such that the Euclidean distance is minimised, where $x=(x_1, x_2, \ldots, x_n)$ is the collected data point and $y=(y_1, y_2, \ldots, y_n)$ is the mean point of a given cluster.

Based on the particular cluster to which the collected data point is assigned the terrain determination is made at step 98.

At the determination algorithm step 96, once it has been determined to which particular cluster the collected data point belongs, the collected data point may be used to update the database 90 in the stored data memory 44 so that the clusters may be updated at step 92 continuously using real-time collected sensor output data, and the updated clusters may be used at the determination step 96 to determine to which particular cluster the next collected data point belongs, as mentioned above.

Although the previous embodiment has been described based on the use of a vector network analyser 50 and a plurality of transmitting 52, 64 and receiving 60, 66 antennas, in alternative embodiments an alternative type of network analyser or hardware arrangement of the transmitters and receivers may be used (for example, a scalar network analyser); there may be a single transmitting antenna and/or a single receiving antenna and; radar signals may be transmitted and received at a plurality of different angles of incidence to the ground.

In an alternative embodiment, some other metric may be used at the determination algorithm step 96: for example, Minkowski distance, Chebyshev distance, or Manhattan distance.

Due to the similar physical properties of some terrain types, the determined terrain 98 may be incorrectly categorised or categorised with a low percentage confidence against a particular terrain type. For example, dry ground may be incorrectly determined to be wet ground or sand, or snow may be incorrectly determined to be sand.

The invention may reduce the incidents of incorrect or inconclusive terrain determination 98 by comparing the terrain determination 98 with the results of a comparison secondary data obtained from a secondary data source against a dataset for the terrain determination. Secondary data sources include the thermometer 17 and the GPS device 37. Other secondary data sources include a high definition (HD) map, humidity sensor and rain sensors such as those that trigger a vehicle's windscreen wipers. Secondary data may be obtained from another type of sensor, such as an optical sensor and/or an infrared sensor.

Figure 9:
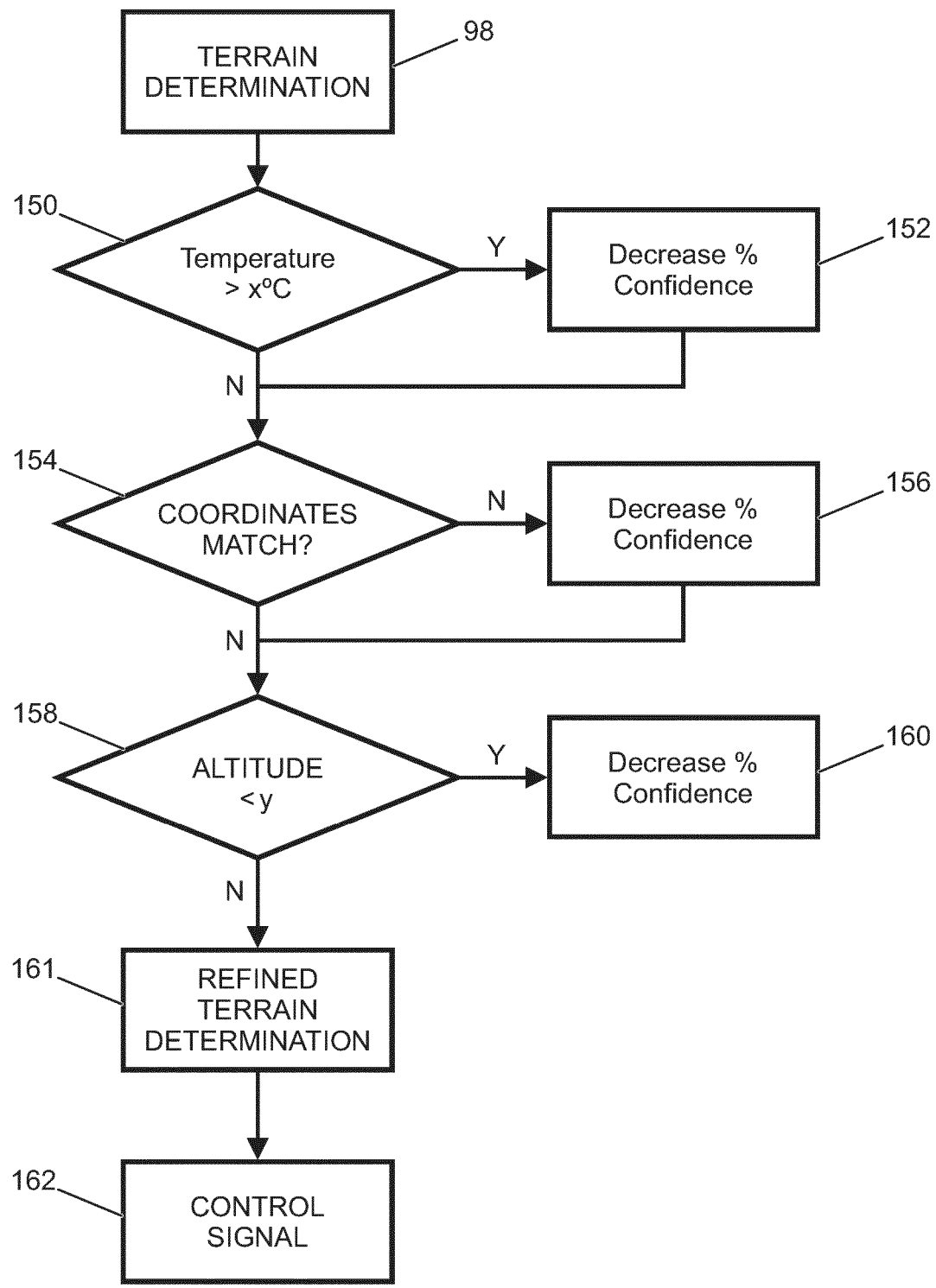
FIG. 9 is a flow diagram which illustrates a process for refining a terrain determination produced by the process illustrated in FIG. 4.

In the example illustrated in FIG. 9, the terrain determination 98 is that the terrain that the vehicle is moving over may be snow or sand. The determination is expressed with a percentage confidence. In the current example, the percentage confidence that the terrain type is snow is 85% and the percentage confidence that the terrain type is sand is 70%. The percentage confidences are stored in the data memory 44.

The data processor 40 receives temperature data relating to the temperature exterior to the vehicle 10 from the external thermometer 17. The data processor 40 compares the temperature data against a stored threshold (x° C.) snow, for example 3° C. If the temperature is greater than 3° C. (>3° C.), it is less likely that the terrain is snow.

In the current example, the temperature is found to be greater than 3° C. at step 150. Accordingly, the processor 40 decreases the percentage confidence by a proportional amount at step 152 since it is unlikely that the terrain type would be snow when the ambient temperature is above 3° C. The adjusted determination is stored in the data memory 44.

The data processor 40 receives positional data in the form of coordinates relating to the location of the vehicle 10 on the surface of the Earth. In the current example, the data processor 40 determines at step 154 that the vehicle 10 is at a location at which snow is unlikely, for example in a desert. Accordingly, the processor 40 decreases the percentage confidence by a proportional amount at step 156 since it is unlikely that the terrain type would be snow if the vehicle is located in the tropics. The adjusted determination is stored in the data memory 44.

The data processor 40 receives altitude data relating to the altitude of the vehicle 10. The data processor 40 compares at step 158 the altitude data against a stored altitude threshold (y), for example 1000 metres. If the altitude of the vehicle 10 is less than 1000 metres (<y) it is less likely that the terrain is snow.

In the current example, the altitude is found to be lower than 1000 metres at step 158. Accordingly, the processor 40 decreases the percentage confidence by a proportional amount at step 160 since it is unlikely that the terrain type would be snow when the altitude is lower than 1000 metres. The adjusted determination is stored in the data memory 44.

The refined terrain determination is produced at step 161. In the present example, the final adjusted determination for snow has a value of 55%.

Equally, when the secondary data falls within data sets relating to the original determination of the terrain type, the percentage confidence is increased. In this respect, the method illustrated in FIG. 9 is performed against the percentage determination for sand which results in an increased percentage confidence of 90% for sand.

Accordingly the revised determination is that the terrain type is sand. The VCS 38 then sends a control signal 162 to the VTRS 30 that the terrain type in the proximity of the vehicle 10 is sand. The VTRS 30 may then adjust the vehicle setup, as appropriate, to best negotiate the terrain type.

In further embodiments of the invention, the vehicle 10 may receive secondary data from a remote source which the data processor 40 uses to adjust the terrain determination 98. For example, data may be wirelessly downloaded from a remote server via the Internet. For example, the data may contain details of previous analysis of the terrain provided from other vehicles recently in the vehicle's 10 location. The data may further or instead comprise high definition map data, allowing a vehicle to triangulate itself from known landmarks.

In an alternative embodiment, rather than sending a control signal 162 to the VTRS 30 to adjust the vehicle setup, the VCS 38 can be responsible for simply alerting a vehicle user via the HMI 36 as to the terrain type in proximity to the vehicle 10.

It will be appreciated by a person skilled in the art that the invention could be modified to take many alternative forms without departing from the scope of the appended claims.

Further aspects of the present invention are set out in the following numbered Clauses:

Clause 1: A system for use in a vehicle for determining the terrain or terrain surface in proximity to a vehicle, the system comprising: a processor configured to receive primary output data from at least one vehicle-mounted sensor, and secondary output data from a secondary data source; and a data memory configured to store pre-determined primary data relating primary output data for the at least one vehicle-mounted sensor to a particular terrain type, and store at least one data set relating to one or more terrain types; wherein the processor is configured to compare the primary output data with the pre-determined data to determine an indication of the particular terrain type corresponding to the primary output data, and compare the secondary output data with a data set corresponding to the indication of the particular terrain type.

Clause 2: A system according to Clause 1, wherein the indication of the particular terrain type is adjusted in response to the comparison of the secondary output data with a data set corresponding to the indication of the particular terrain type.

Clause 3: A system according to Clause 1, wherein the indication of the particular terrain type is expressed as a percentage confidence Clause 4: A system according to Clause 3, wherein the processor is arranged to adjust the percentage confidence in response to the comparison of the secondary output data with a data set corresponding to the indication of the particular terrain type.

Clause 5: A system according to Clause 3, wherein the processor is arranged to decrease the percentage confidence that the indication of the particular terrain type if the secondary output data falls outside a data set corresponding to the indication of the particular terrain type.

Clause 6: A system according to Clause 3, wherein the processor is arranged to increase the percentage confidence if the secondary output data falls within a data set corresponding to the indication of the particular terrain type.

Clause 7: A system according Clause 1, wherein the pre-determined secondary data relating to the secondary output data to one or more data sets relating to one or more terrain types is stored in the data memory.

Clause 8: A system according to Clause 1, wherein each data set comprises at least one value and/or range.

Clause 9: A system according to Clause 1, wherein the secondary output data comprises data relating to the external environment of the vehicle.

Clause 10: A system according to Clause 1, wherein the secondary output data comprises data relating to one or more of: the location of the vehicle; the altitude of the vehicle; the weather; humidity; precipitation and the temperature external to the vehicle.

Clause 11: A system according to Clause 1, wherein the secondary data source comprises one or more of a wireless data receiver; a thermometer; a GPS device; a high definition (HD) map; humidity sensor; and rain sensor.

Clause 12: A system according to Clause 1, wherein the at least one vehicle-mounted sensors include at least one radar sensor and at least one acoustic sensor, each for receiving a reflected signal from the terrain beneath and/or ahead of the vehicle.

Clause 13: A system according to Clause 1, comprising a HMI device enabling communication of the verification of the terrain type to the user.

Clause 14: A system according to Clause 1, wherein the processing means is arranged to analyse parameters relating to primary output data and clustering the primary output data into a plurality of clusters, wherein each cluster corresponds to a different terrain type.

Clause 15: A system according to Clause 14, wherein the processor is configured to determine to which one of the clusters the sensor output data belongs so as to determine an indication of the terrain type.

Clause 16: A system according to Clause 14, comprising associating one or more clusters with a data set relating to a terrain type.

Clause 17: A system according to Clause 1, wherein the system is arranged to control at least one vehicle subsystem in dependence on the verification of the terrain type.

Clause 18: A method for use in a vehicle for determining the terrain type in proximity to a vehicle, the method comprising: receiving primary output data from at least one vehicle-mounted sensor; receiving secondary output data from a secondary data source; storing pre-determined primary data relating to the primary output data, for the at least one vehicle-mounted sensor, to a particular terrain type; comparing the primary output data with the pre-determined primary data to determine an indication of the particular terrain type corresponding to the primary output data; receiving secondary output data from a further data source; and comparing the secondary output data against a data set corresponding to the indication of the particular terrain type.

Clause 19: The method according to Clause 18, the method comprising adjusting the indication of the particular terrain type in response to the comparison of the secondary output data with a data set corresponding to the indication of the particular terrain type.

Clause 20: A method according to Clause 18, wherein the indication of the particular terrain type is expressed as a percentage confidence.

Clause 21: A method according to Clause 20, the method comprising adjusting the percentage confidence in response to the comparison of the secondary output data with a data set corresponding to the indication of the particular terrain type.

Clause 22: A method according to Clause 20, the method comprising decreasing the percentage confidence of the indication of the particular terrain type if the secondary output data falls outside a data set corresponding to the indication of the particular terrain type.

Clause 23: A method according to Clause 20, the method comprising increasing the percentage confidence if the secondary output data falls within a data set corresponding to the indication of the particular terrain type.

Clause 24: A method according Clause 18, comprising enabling communication of the result of the comparison of the secondary output data against a data set corresponding to the indication of the particular terrain type to the user.

Clause 25: A method according to Clause 18, comprising analysing parameters relating to primary output data and clustering the primary output data into a plurality of clusters, wherein each cluster corresponds to a different terrain type.

Clause 26: A method according to Clause 25, comprising associating one or more clusters with a data set.

Clause 27: A method according to Clause 18, further comprising controlling at least one vehicle subsystem in dependence on the comparison of the secondary output data against a data set corresponding to the indication of the particular terrain type.

Clause 28: A data memory containing a computer readable code for performing the method according to Clause 18.

Clause 29: A vehicle comprising a system according to Clause 1.

The invention claimed is:

1. A system for use in a vehicle for determining terrain type in proximity to the vehicle, the system comprising:
a processor configured to:
receive primary output data from at least one vehicle-mounted sensor in a form of at least one received polarised signal representative of power in a received polarisation component of a radar signal reflected from a terrain ahead of the vehicle;
determine a ratio based on the at least one received polarised signal;
receive secondary output data from a secondary data source;
compare the ratio determined from the primary output data with the primary pre-determined data to determine an indication of the particular terrain type corresponding to the primary output data, and wherein the primary pre-determined data relates primary output data for the at least one vehicle-mounted sensor to a particular terrain type, and at least one data set relates to one or more terrain types;
compare the secondary output data with a data set corresponding to the indication of the particular terrain type, wherein the indication of the particular terrain type is adjusted in response to the comparison of the secondary output data with a data set corresponding to the indication of the particular terrain type; and
control at least one vehicle subsystem based on the adjustment.

2. The system according to claim 1, wherein the indication of the particular terrain type is expressed as a percentage confidence.

3. The system according to claim 2, wherein the processor is arranged to adjust the percentage confidence in response to the comparison of the secondary output data with a data set corresponding to the indication of the particular terrain type.

4. The system according to claim 2, wherein the processor is arranged to decrease the percentage confidence that the indication of the particular terrain type responsive to the secondary output data falling outside a data set corresponding to the indication of the particular terrain type.

5. The system according claim 2, wherein the processor is arranged to increase the percentage confidence responsive to the secondary output data falling within a data set corresponding to the indication of the particular terrain type.

6. The system according to claim 1, wherein the pre-determined secondary data relating to the secondary output data to one or more data sets relating to the one or more terrain types is stored in a data memory.

7. The system according to claim 1, wherein each data set comprises at least one value and/or range.

8. The system according to claim 1, wherein the secondary output data comprises data relating to an external environment of the vehicle.

9. The system according to claim 1, wherein the secondary output data comprises data relating to at least one selected from the following group: a location of the vehicle; an altitude of the vehicle; weather; humidity; precipitation; and a temperature external to the vehicle.

10. The system according to claim 1, wherein the secondary data source comprises at least one selected from the following group: a wireless data receiver; a thermometer; a GPS device; a high definition (HD) map; a humidity sensor; and a rain sensor.

11. The system according to claim 1, wherein the processor is further configured to receive output data from the at least one vehicle-mounted radar sensors include at least one radar sensor and at least one acoustic sensor, each for receiving a reflected signal from the terrain beneath and/or ahead of the vehicle.

12. The system according to claim 1, further comprising a human-machine interface device enabling communication of a verification of the terrain type to a user.

13. The system according to claim 1, wherein the processing means processor is arranged to analyze parameters relating to the primary output data and clustering the primary output data into a plurality of clusters, wherein each cluster corresponds to a different terrain type.

14. The system according to claim 1, wherein the system is arranged to control at least one vehicle subsystem based on a verification of the terrain type.

15. A vehicle comprising the system according to claim 1.

16. The system according to claim 1, wherein the at least one received polarised signal includes at least one of the following: a received horizontally polarised signal representative of power in a received horizontal polarisation component of the radar signal reflected from the terrain ahead of the vehicle, a vertically polarised signal representative of power in a received vertical polarisation component of the radar signal reflected from the terrain ahead of the vehicle, a received elliptically polarised signal, and a received circularly polarised signal.

17. A method for use in a vehicle for determining terrain type in proximity to the vehicle, the method comprising:
- receiving, by a processor, primary output data from at least one vehicle-mounted sensor in a form of at least one received polarised signal representative of power in a received polarisation component of a radar signal reflected from a terrain ahead;
- determining, by the processor, a ratio based on the at least one received polarised signal;
- receiving, by the processor, secondary output data from a secondary data source;
- storing, by the processor, pre-determined primary data relating to the primary output data, for the at least one vehicle-mounted sensor, to a particular terrain type;
- comparing, by the processor, the ratio determined from the primary output data with the pre-determined primary data to determine an indication of the particular terrain type corresponding to the primary output data;
- receiving, by the processor, secondary output data from a further data source;
- comparing, by the processor, the secondary output data against a data set corresponding to the indication of the particular terrain type;
- adjusting, by the processor, the indication of the particular terrain type in response to the comparison of the secondary output data with the data set corresponding to the indication of the particular terrain type; and
- controlling, by the processor, at least one vehicle subsystem based on the adjustment.

18. The method according to claim 17, wherein the indication of the particular terrain type is expressed as a percentage confidence.

19. The method according to claim 18, the method further comprising adjusting the percentage confidence in response to the comparison of the secondary output data with a data set corresponding to the indication of the particular terrain type.

20. The method according to claim 18, the method further comprising decreasing the percentage confidence of the indication of the particular terrain type when the secondary output data falls outside the data set corresponding to the indication of the particular terrain type.

21. The method according to claim 18, the method further comprising increasing the percentage confidence when the secondary output data falls within the data set corresponding to the indication of the particular terrain type.

22. The method according to claim 17, wherein the at least one received polarised signal includes at least one of the following: a received horizontally polarised signal representative of power in a received horizontal polarisation component of the radar signal reflected from the terrain ahead of the vehicle, a vertically polarised signal representative of power in a received vertical polarisation component of the radar signal reflected from the terrain ahead of the vehicle, a received elliptically polarised signal, and a received circularly polarised signal.

* * * * *